United States Patent Office 2,753,266
Patented July 3, 1956

2,753,266

PENICILLIN IN FEED

Walther H. Ott, Westfield, N. J., assignor, by mesne assignments, to Merck & Co., Inc., Rahway, N. J., a corporation of New Jersey No Drawing. Application April 24, 1950,
Serial No. 157,849

7 Claims. (Cl. 99—2)

This invention is concerned generally with improved animal feeds containing novel growth-promoting factors. More particularly, it relates to animal feeds supplemented with penicillin as a growth-promoting factor and with the method of accelerating the growth of animals by administration of feedstuffs containing this novel growth-promoting factor.

It is known that, in addition to the usual nutrients and vitamins required in the diet of animals, it is necessary to include a sufficient quantity of an unknown factor identified as the "animal protein factor" in order to promote maximum growth. Various complex substances such as meat scraps, fish meal and fish solubles containing this unknown protein factor in varying amounts have been used to supplement animal diets. More recently it has been found that vitamin $B_{12}$ and related vitamin $B_{12}$-like compounds have animal protein factor activity, and can be used as feed supplements in place of these complex substances. It was previously thought that, when animals were fed a diet complete with respect to the usual nutrients and vitamins, and also containing an adequate amount of the "animal protein factor," the growth of said animals was the maximum obtainable with the strain of animals under the conditions employed.

It is now discovered that it is possible to achieve remarkable and unexpected acceleration in the growth rate of animals superior to that obtainable with the complete diet described in the preceding paragraph, by incorporating in said diet a relatively small amount of penicillin. When penicillin is added to an otherwise nutritionally-adequate diet, I have found that animals fed the penicillin-supplemented diet gain weight more rapidly than animals fed the same diet without the added penicillin component. Moreover, this growth-promoting effect, resulting from the incorporation of penicillin in the animal diet, is obtained whether the penicillin is added to a nutritionally-adequate feedstuff (as for example an animal feed containing all known nutrients and, as a source of animal protein factor, vitamin $B_{12}$ and/or fish meal) or whether the penicillin is added to a nutritionally-deficient feedstuff (as for example a feed deficient in animal protein factor).

Although the penicillin can be added to the animal diet in a number of ways, it is presently preferred to incorporate the penicillin directly in the feedstuff. Alternatively, the penicillin can be administered to the animals separately, as for example, in a supplementary feed or in the drinking water.

The penicillin can be added to the animal diet in any one of a number of forms, as for example in the form of a salt of penicillin such as the sodium salt of penicillin G, the procaine salt of penicillin G, and the like. If preferred, the penicillin can be used as such or in the form of a concentrate or adsorbate prepared from *Penicillium chrysogenum* fermentation broths. For example, penicillin can be adsorbed from the broth by various agents such as fuller's earth and carbon and the resulting dried adsorbate can then be added to the feed in the desired amounts. Alternatively, the filtered broth can be evaporated to dryness and incorporated in the animal diet in this form.

It is ordinarily preferred to utilize purified salts of penicillin G since these are especially efficacious in achieving the remarkable results of this invention, in view of the fact that the purified salts of penicillin G provide a standardized source of this growth promoting factor. Thus, it is possible to supplement a diet, complete as to the usual nutrients and vitamins, with pure vitamin $B_{12}$ as the source of animal protein factor and enriched with a pure salt of penicillin G as a supplementary growth-promoting agent, both factors, the vitamin $B_{12}$ and the penicillin salt being active, at predetermined levels, in promoting the growth of animals in measurable amounts.

While the exact function of penicillin in animal nutrition is not understood, it is postulated that penicillin alters the intestinal flora of the animal, and favors the growth of certain types of microorganisms which produce larger amounts of the growth-promoting factor or factors. Of course, this may not be the correct explanation for the action of the penicillin in the diet, and I do not wish to be bound by such theoretical considerations, however likely these may be.

As indicated previously, in one embodiment of my invention, it is preferred to incorporate penicillin directly in the feedstuff containing the animal protein factor. Any suitable method for dispersing the material uniformly throughout the feed mixture can be used. The amount of penicillin added to the animal diet may be varied in order to achieve the beneficial results of my invention. It is ordinarily found that an amount within the range of about 1 to 300 mgs. per kg. of feedstuff promotes the maximum growth in animals fed the penicillin-supplemented diet. While a remarkable acceleration of the growth rate is obtained at these various levels of penicillin supplementation, I ordinarily prefer to utilize about 10 to 40 mgs. of penicillin per kg. of feedstuff, since I have found that a feedstuff containing this amount of penicillin when utilized as an animal feed, will result in an optimum growth rate under desirable conditions.

I have further found that the inclusion of penicillin is particularly valuable when vitamin $B_{12}$ and/or vitamin $B_{12}$-like compounds are employed as a source of the animal protein factor in feedstuffs. For example, using diets supplemented with vitamin $B_{12}$ and penicillin, I have been able to show that it is possible to obtain a weight increase between 10 and 20% greater than the weight gained by chicks on the same diet without the added penicillin component.

Feedstuffs supplemented with penicillin are particularly suitable for the commercial growing of poultry. By utilizing such supplemented diets it is possible to greatly accelerate the rate at which poultry such as chickens, turkeys and ducks are brought to marketable weight. This is of economic importance to the poultry raiser since it enables him to increase the capacity of his equipment. Another advantage of my supplemented diets is that the added antibacterial agent is efficacious in preventing or checking diseases in poultry or other animals.

The following examples illustrate methods of carrying out the present invention, but it is to be understood that these examples are given for purposes of illustration and not of limitation.

EXAMPLE 1

Day-old chicks used in these tests were hatched from eggs produced by hens fed the following ration, which contains no animal protein supplement and which is low in vitamin $B_{12}$ content:

Hen diet No. 1

48.5 parts yellow corn meal
20.0 parts soybean meal
20.0 parts wheat middlings
5.0 parts alfalfa meal
3.0 parts steamed bone meal
3.0 parts ground limestone
0.5 part sodium chloride
0.22 part "Viadex" (5000 units vitamin A and 1000 units vitamin D per gram)
0.001 part riboflavin
(These parts are by weight.)

The day-old chicks were placed in electrically-heated metal battery brooders and fed the following practical all-vegetable, vitamin $B_{12}$-deficient diet for a preliminary period of three days:

Chick diet No. C–5

63.3 parts yellow corn meal
30.0 parts soybean meal
2.0 parts alfalfa meal
2.0 parts bone ash
1.5 parts calcium carbonate
0.5 part sodium chloride
0.4 part choline chloride dry mix (25% choline chloride)
0.2 part "Viadex"
0.02 part manganese sulfate
0.05 part inositol
0.015 part p-aminobenzoic acid
0.002 part niacin
0.0015 part calcium pantothenate
0.0005 part pyridoxine
0.0005 part riboflavin
0.00025 part thiamine
0.00005 part 2-methylnaphthoquinone
0.0000125 part biotin
(These parts are by weight.)

At the end of the preliminary period, the chicks were wing-banded for identification and distributed into three groups of 10 chicks each balanced in regard to individual body weights as well as average body weights. One group of chicks was maintained on the vitamin $B_{12}$-deficient chick diet C–5 and served as the control. Each of the other two groups was placed on an experimental diet which consisted of diet C–5 supplemented with penicillin G sodium. Data on the experimental diets and the growth results at the end of 18 days on said diets are as follows:

| Experiment No. | 370A–1 | 370A–2 | 370A–3 |
|---|---|---|---|
| Basal Diet | C–5 | C–5 | C–5 |
| Penicillin G sodium, mg. added/kg. diet milligrams | none | 20 | 20 |
| No. of chicks tested | 10 | 10 | 10 |
| Sex of chicks | F | F | F |
| Average Initial Chick weight, gms | 43.7 | 43.7 | 43.7 |
| Mean gain in weight: | | | |
| Grams/chick/day | 4.06 | 4.52 | 4.97 |
| Percent Extra gain | | 11 | 22 |

It will be noted that the mean daily gain in weight of chicks fed the basal diet C–5 supplemented with penicillin G sodium (Experiments Nos. 370A–2 and 370A–3) was approximately 10–20% greater than the mean daily gain in weight of chicks fed the unsupplemented basal diet (Experiment 370A–1).

EXAMPLE 2

In another series of experiments with chicks, which were run substantially in accordance with the procedure described in Example 1, day-old chicks were fed diet C–5 for a preliminary period of two days and then distributed into three groups of 10 chicks each balanced in regard to individual body weights as well as average body weights.

One group of chicks was then placed on a diet which consisted of the basal diet C–5 supplemented with 20 micrograms of vitamin $B_{12}$ per kg. of diet. Each of the other two groups of chicks was likewise placed on a diet consisting of C–5 supplemented with vitamin $B_{12}$ but containing, in addition, penicillin G sodium. Data on the experimental diets and the growth results at the end of 19 days on said diets are as follows:

| Experiment No. | 370B–4 | 370B–5 | 370B–6 |
|---|---|---|---|
| Basal diet | C–5 | C–5 | C–5 |
| Vitamin $B_{12}$, $\gamma$ added/kg. diet | 20 | 20 | 20 |
| Penicillin G. sodium, mg. added/kg. diet milligrams | none | 10 | 40 |
| No. of chicks tested | 10 | 10 | 10 |
| Sex of chicks | M | M | M |
| Average initial chick weight, gms | 42.1 | 42.1 | 42.1 |
| Mean gain in weight: | | | |
| Grams/chick/day | 6.12 | 7.01 | 7.02 |
| Percent Extra gain | | 15 | 15 |

Current knowledge of chick nutrition indicates that the vitamin $B_{12}$-supplemented diet used in Experiment No. 370B–4 should supply all known nutrients required by the chick. Hitherto, the growth obtainable with such a diet has been regarded as the maximum obtainable with the strain of chicks and the conditions employed.

It will be noted that the mean daily gain in weight of chicks fed the penicillin-supplemented diets used in Experiments Nos. 370B–5 and 370B–6 was, however, approximately 15% greater than the mean daily gain in weight of chicks fed the identical diet minus the penicillin component.

EXAMPLE 3

In another series of experiments with chicks, which were run substantially in accordance with the procedure described in Example 1, day-old chicks were fed diet C–5 for a preliminary period of two days and then distributed into three groups of 10 chicks each balanced in regard to individual body weights as well as average body weights.

One group of chicks was then placed on a diet which consisted of the basal diet C–5 supplemented with 20 micrograms of vitamin $B_{12}$ per kg. of diet. Each of the other two groups of chicks was likewise placed on a diet consisting of C–5 supplemented with vitamin $B_{12}$ but containing, in addition, procaine penicillin G. Data on the experimental diets and the growth results at the end of 19 days on said diets are as follows:

| Experiment No. | 375E–7 | 375E–8 | 375E–9 | 375E–10 |
|---|---|---|---|---|
| Basal diet | C–5 | C–5 | C–5 | C–5 |
| Vitamin $B_{12}$, $\gamma$ added/kg. diet | 20 | 20 | 20 | 20 |
| Procaine penicillin G, mg. added/kg. diet mg. | none | 2.5 | 10 | 40 |
| No. of chicks tested | 10 | 10 | 10 | 10 |
| Sex of chicks | M | M | M | M |
| Average Initial chick weight, grams | 51.5 | 51.5 | 51.5 | 51.5 |
| Mean gain in weight: | | | | |
| Grams/chick/day | 6.60 | 7.13 | 7.66 | 7.33 |
| Percent Extra gain | | 8 | 16 | 11 |

Current knowledge of chick nutrition indicates that the vitamin $B_{12}$-supplemented diet used in Experiment No. 375E–7 should supply all known nutrients required by the chick. Hitherto, the growth obtainable with such a diet has been regarded as the maximum obtainable with the strain of chicks and the conditions employed.

It will be noted that the mean daily gain in weight of chicks fed the penicillin-supplemented diets used in Experiment Nos. 375E–8, 375E–9 and 375E–10 was, however, approximately 10–15% greater than the mean daily gain in weight of chicks fed the identical diet minus the penicillin component.

EXAMPLE 4

In another series of experiments run substantially in accordance with the procedure described in Example 1, day-old chicks were fed diet C–5 for a preliminary period of two days and then divided into two groups of 10 chicks each balanced in regard to individual body weights as well as average body weights.

One group of chicks was then placed on a diet which consisted of the basal diet C–5 supplemented with vitamin $B_{12}$ and fish meal and the other group was placed on the same diet but containing, in addition, penicillin G sodium. Data on the experimental diets and the growth results at the end of 19 days on said diets are as follows:

| Experiment No. | 370B–11 | 370B–12 |
|---|---|---|
| Basal Diet | C–5 | C–5 |
| Vitamin $B_{12}$, γ added/kg. diet | 20 | 20 |
| Fish Meal, gms. added/kg. diet | 60 | 60 |
| Penicillin G sodium, mg. added/kg. diet mg. | none | 20 |
| No. of chicks tested | 10 | 10 |
| Sex of chicks | M | M |
| Averagle Initial chick weight, gms. | 45.2 | 45.2 |
| Mean gain in weight: | | |
| Grams/chick/day | 8.56 | 9.44 |
| Percent Extra gain | | 10 |

It will be noted that the mean daily gain in weight of chicks fed the penicillin diet used in Experiment No. 370B–12 was approximately 10% greater than the mean daily gain in weight of chicks fed the identical diet minus the penicillin component.

EXAMPLE 5

Day-old chicks used in these tests were hatched as described in Example 1 from eggs produced by hens fed the following ration, which contains no animal protein supplement and which is low in vitamin $B_{12}$ content:

Hen diet No. 1

48.5 parts yellow corn meal
20.0 parts soybean meal
20.0 parts wheat middlings
5.0 parts alfalfa meal
3.0 parts steamed bone meal
3.0 parts ground limestone
0.5 part sodium chloride
0.22 part "Viadex" (5000 units vitamin A and 1000 units vitamin D per gram)
0.001 part riboflavin (These parts are by weight.)

Chicks, two days old, were placed in electrically-heated metal battery brooders and fed the following completely purified nutritionally adequate diet for a preliminary period of two days:

Chick diet C–10

58.75 parts dextrose
20.0 parts soybean meal
5.0 parts "Ruffex" (a commercially available α-cellulose product)
5.0 part salt mixture (J. Biol. Chem. 174, 1047 (1948))
4.5 parts wheat germ oil
2.5 parts calcium gluconate
2.0 parts amino acetic acid
1.0 part $KH_2PO_4$
0.5 part arginine
0.2 part cystine
0.2 part "Viadex"
0.2 part choline chloride
0.1 part inositol
0.03 part p-aminobenzoic acid
0.01 part niacin
0.004 part calcium pantothenate
0.002 part pyridoxine
0.002 part thiamine
0.002 part riboflavin
0.0004 part folic acid
0.0004 part menadione
0.00004 part biotin
0.00004 part vitamin $B_{12}$ (These parts are by weight.)

At the end of the preliminary period the chicks were divided into two groups of 10 chicks each balanced in regard to individual body weight as well as average body weight.

One group of chicks was maintained on diet C–10 and the other group was placed on the same diet but containing, in addition, penicillin G sodium. Data on the experimental diets and the growth-results at the end of 19 days on said diets are as follows:

| Experiment No. | 370B–13 | 370B–14 |
|---|---|---|
| Basal Diet | C–10 | C–10 |
| Penicillin G sodium, mg. added/kg. diet mg. | none | 20 |
| No. of chicks tested | 10 | 10 |
| Sex of chicks | M | M |
| Average Initial chick weight, gms. | 45.2 | 45.2 |
| Mean gain in weight: | | |
| Grams/chick/day | 9.01 | 10.24 |
| Percent Extra Gain | | 14 |

It will be noted that the mean daily gain in weight of chicks fed the penicillin supplemented diet used in Experiment 370B–14 was approximately 15% greater than the mean daily gain in weight of chicks fed the identical diet minus the penicillin component.

Various changes and modifications may be made in carrying out the present invention without departing from the spirit and scope thereof. Insofar as these changes and modifications are within the purview of the annexed claims they are to be considered as part of my invention.

I claim:

1. An animal feedstuff for accelerating the growth of animals comprising a solid feedstuff, nutritionally adequate per se, having dispersed therein penicillin in an amount equivalent to 1 to 300 mgs. of pure penicillin per kilogram of said feedstuff.

2. An animal feedstuff for accelerating the growth of animals comprising a solid feedstuff, nutritionally adequate per se having dispersed therein a salt of penicillin in an amount equivalent to 1 to 300 mgs. of the pure salt of penicillin per kilogram of said feedstuff.

3. An animal feedstuff for accelerating the growth of animals comprising a solid feedstuff, nutritionally adequate per se having dispersed therein procaine penicillin in an amount equivalent to 1 to 300 mgs. of pure procaine penicillin per kilogram of said feedstuff.

4. An animal feedstuff for accelerating the growth of animals comprising a solid feedstuff, nutritionally adequate per se having dispersed therein penicillin in an amount equivalent to 1 to 40 mgs. of pure penicillin per kilogram of said feedstuff.

5. An animal feedstuff for accelerating the growth of animals comprising a solid feedstuff, nutritionally adequate per se having dispersed therein added vitamin $B_{12}$ and penicillin, said penicillin being in an amount equivalent to 1 to 40 mgs. of pure penicillin per kilogram of said feedstuff.

6. An animal feedstuff for accelerating the growth of animals comprising a solid feedstuff, nutritionally adequate per se having dispersed therein a salt of penicillin in an amount equivalent to 1 to 40 mgs. of the pure salt of penicillin per kilogram of said feedstuff.

7. An animal feedstuff for accelerating the growth of animals comprising a solid feedstuff nutritionally adequate per se having dispersed therein procaine penicillin in an amount equivalent to 1 to 40 mgs. of pure procaine penicillin per kilogram of said feedstuff.

(References on following page)

References Cited in the file of this patent

UNITED STATES PATENTS

| | | |
|---|---|---|
| 2,442,141 | Moyer | May 25, 1948 |
| 2,449,340 | Tanner | Sept. 14, 1948 |

OTHER REFERENCES

Parvo, Feed Supplement, copyright 1947, Lederle Lab. Booklet, page 11.

Matterson et al.: Bulletin 275, March 1951, Storrs Ag. Experiment Sta., Storrs, Conn.

Ratcliff: Antibiotics for Poultry and Pigs, Science News Letter, May 5, 1951, pages 282–283.

Brande et al.: Antibiotics and Chemotherapy, 3, 3, "The Value of Antibiotics in the Nutrition of Swine: A Review," March 1953, pages 271–306.

Curran et al.: Proc. Soc. Exptl. Biol. and Med., 58, #3, pages 263, 264.